UNITED STATES PATENT OFFICE.

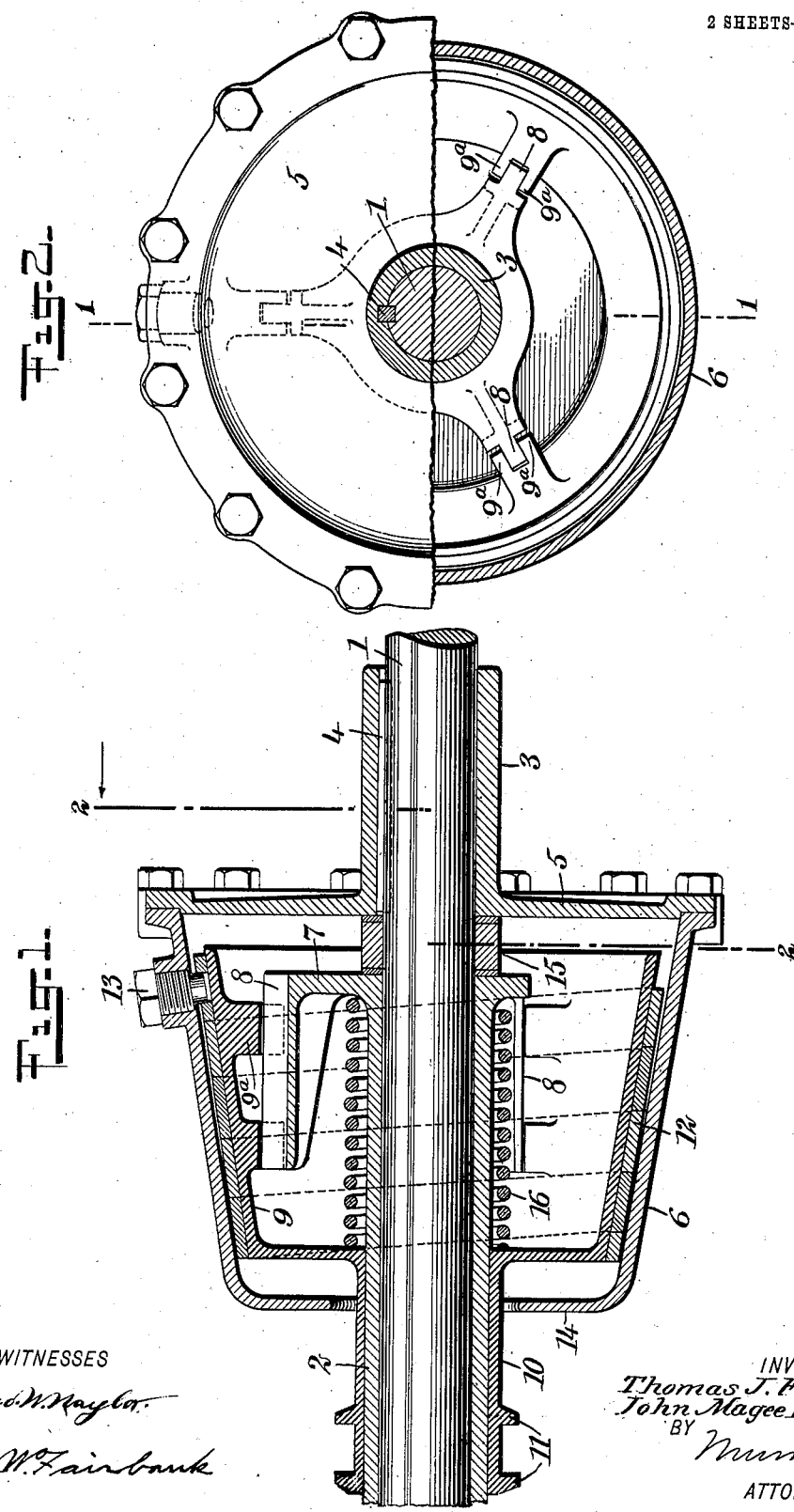

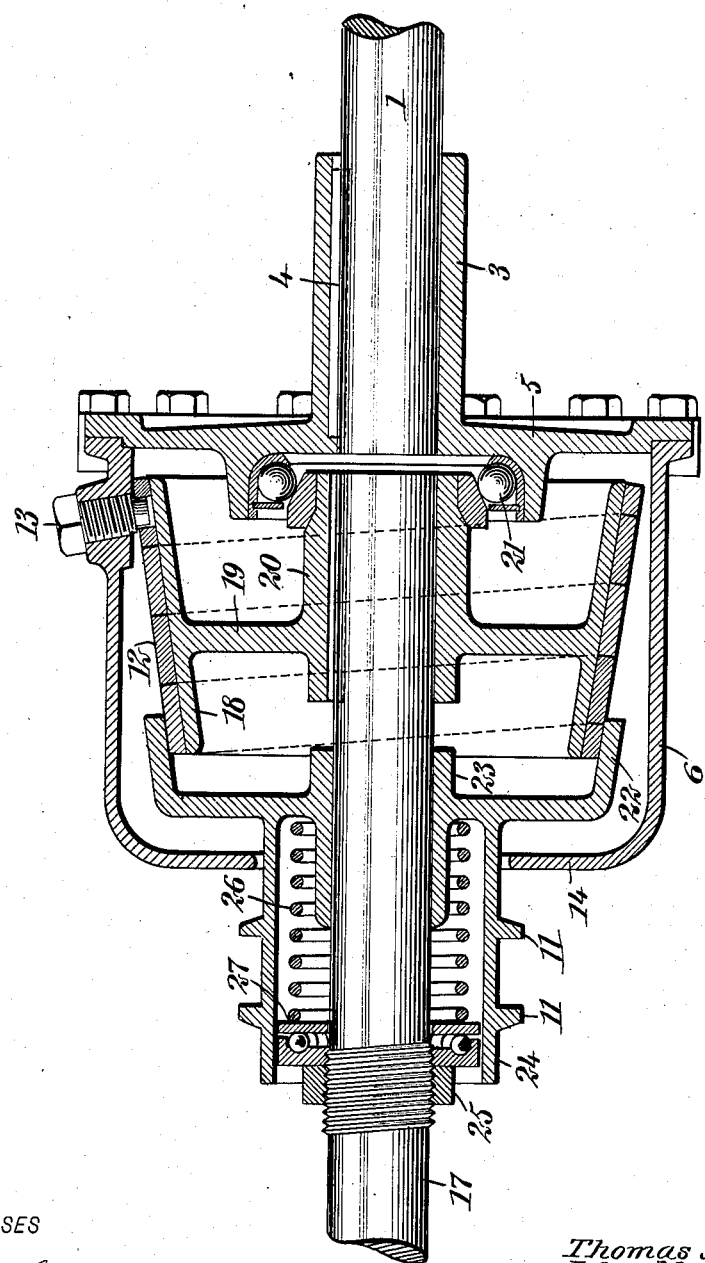

THOMAS J. FAY, OF NEW YORK, N. Y., AND JOHN MAGEE ELLSWORTH, OF BERNARDSVILLE, NEW JERSEY.

CLUTCH.

No. 842,640.  Specification of Letters Patent.  Patented Jan. 29, 1907.

Application filed October 12, 1906. Serial No. 338,585.

*To all whom it may concern:*

Be it known that we, THOMAS J. FAY, a resident of the city of New York, borough of Brooklyn, in the county of Kings and State of New York, and JOHN MAGEE ELLSWORTH, a resident of Bernardsville, in the county of Somerset and State of New Jersey, and both citizens of the United States, have invented a new and Improved Clutch, of which the following is a full, clear, and exact description.

This invention relates to certain improvements in clutches, and particularly clutches designed for use in transmitting power from the driving member to the driven member of motor-vehicles; and the object of the invention is to provide a clutch of small diameter, whereby the weight is very materially reduced and whereby we may employ a flywheel fan.

A further object of the invention is to provide a clutch of such size that it may be readily housed and the housing filled or partially filled with a lubricant without materially adding to the weight of the vehicle in connection with which the clutch is employed.

A further object of the invention is to provide a clutch in which the power is transmitted from the driving member to the driven member by means of a spiral steel band offering a very large wearing-surface and capable of being slipped at will without interfering with the ability of the clutch to firmly hold the driving and the driven members in their fixed relation when the clutch is thrown into operation.

Further objects and advantages of our improved clutch will be hereinafter set forth, and the novel structure thereof defined in the claims.

Reference is to be had to the accompanying drawings, forming a part of this specification, in which similar characters of reference indicate corresponding parts in all the figures, in which—

Figure 1 is a longitudinal section through one form of our improved clutch and taken on the line 1 1 of Fig. 2. Fig. 2 is an end elevation of the clutch shown in Fig. 1, a portion thereof being broken away on the line 2 2; and Fig. 3 is a central longitudinal section of a modified form.

In the specific embodiment of our invention which is disclosed in Figs. 1 and 2 we provide a driving-shaft 1, having a sleeve 2, surrounding the same for a portion of its length and adapted to be secured to the shaft through our improved clutch and to thus constitute the driven member. The shaft 1 carries a suitable collar 3, rigidly secured thereto by means of a key 4 and having a circular plate or disk 5 extending outward from the collar at substantially right angles. This disk carries a casing 6 in the form of a truncated cone, and within this casing are inclosed the operating parts of our improved clutch. The sleeve constituting the driven member is provided with a plurality of arms 7, each of which supports a flange 8, extending substantially parallel to the driving-shaft and the driven member.

Surrounding the sleeve 2 and its arms and flanges is a hollow cone 9, having projections or lugs 9ª extending inwardly toward the center thereof, and adapted to receive the flanges 8 of the driven member. The arms and flanges of the driven member serve to support the cone 9 and permit of the transmission of power from the cone to the sleeve 2 and at the same time permitting longitudinal movement of the cone in respect to the sleeve. The cone is provided with a sleeve 10, surrounding the sleeve 2, and flanges 11 are provided on this sleeve, whereby the cone may be moved longitudinally in respect to the driving and driven members. The cone 9 is inclosed within the outer cone 6, and the two cones are of slightly-different angularity, the inclination of the outer cone being the greater, whereby when the cones are telescoped together they will contact at their smaller ends, but will be free at their larger ends.

Intermediate the two cones and encircling the inner cone 9 is a spiral steel band 12, having one end thereof secured to the casing 6 of the driving member and having the opposite end entirely free. The end of the band may be secured to the driving member in any suitable manner, but preferably by providing a perforation in the band through which extends the inner end of a screw-bolt 13. The parts are so proportioned that as the inner cone 9 is moved toward the disk 5 of the driving member it slips partly out of the steel band 12, and as the latter is constantly rotated and is thrown out by centrifugal force against the inner surface of the outer cone such movement of the inner cone would entirely disconnect the driven member from the driving member; but as the inner cone 9 is moved in the opposite direction it finally reaches a point where the free end of the steel band is gripped between the converging surfaces of the inner and outer cones, and the end of the band is thus bound to the inner cone. The band then tightly wraps itself around the inner cone, and power is transmitted from the driving member throughout the entire length of the steel band, and thus to the cone 9, carried by the driven member. The two cones being of different angularity, the outer cone does not contact with the inner one or with the steel band, except at the smaller end when the device is in the operative position. Due to centrifugal force, the steel band is thrown out against the inner surface of the outer cone as soon as the free end is liberated and then is not in contact with the inner cone at any point, thus permitting the inner cone to remain stationary while the outer cone and the steel band are rapidly rotating.

The outer cone 6 is preferably provided with an inwardly-directed flange 14, substantially parallel to the supporting disk or plate 5, and this flange terminates closely adjacent the sleeve 10 of the inner cone. Oil is placed within the casing and is prevented from escaping by this flange, which at the same time prevents the entrance of foreign particles which would interfere with the operation of the clutch.

No leather or other similar material is used in any part of the device, and there are no parts to become rapidly worn away and necessitate replacing. Any suitable form of packing 15 may be employed between the end of the driven member 2 and the disk or plate 5, and a spring 16 is preferably employed for normally forcing the two cones into operative position and hold the parts of the clutch in engagement with each other.

In Fig. 3 we have illustrated a modified form of our improved clutch and in which the same driving-shaft 1, collar 3, plate or disk 5, and key 4 are employed. The driven member is in the form of a shaft 17, and the inner cone 18, extending to the cone 9 of the form above described, is rigidly supported upon arms 19, extending outward from a collar 20, keyed to the shaft 17, so that in this case the inner cone is prevented from longitudinal movement. Any suitable form of ball-bearing 21 is provided intermediate the collar 20 and the plate 5, whereby the inner end of the driven shaft 17 is journaled. A steel band 12 is provided, similar to the steel band in the form above described, and this is secured by a screw-bolt 13 to a casing 6, carried by the disk or plate 5. This casing may, if desired, be cylindrical in form and need not extend adjacent the band, save at the larger end, as the casing 6 is not employed in this case to bind the free end of the steel band to the cone 18. The outer cone 22, employed for accomplishing this object, is supported upon a sleeve 23, carried by the driven shaft, and this is moved longitudinally of the driven shaft by means of a sleeve 24, extending out through the opening in the flange 14 of the casing, and is provided with flanges 11, whereby it may be operated. For normally holding this outer cone in its operative position we provide the driven shaft with a nut 25 or other suitable stop, and this serves as the support for the cup of a ball-bearing. A coil-spring 26 is provided within the sleeve 24 and bears against an annular plate 27, forming the other portion of the ball-bearing. Normally the spring forces the outer cone 22 into a position where it may grip the free end of the steel band 12 and bind it to the inner cone 18 to cause the transmission of power from the driving member throughout the length of the steel band and to the inner cone carried by the driven member. When the parts are in their inoperative position, the outer cone does not rotate, as it is connected to neither the driving nor the driven member. As soon as it binds the steel band to the inner cone it rotates with the inner cone and the driven shaft. The outer cone does not extend throughout the entire length of the inner cone, as its sole function is to bind the free end of the band to the smaller end of the inner cone, and it therefore extends only a sufficient distance to properly accomplish the desired result.

It is evident that various changes may be made in the structure of our improved clutch and other forms designed in addition to the two above described without departing from the spirit of our invention.

Having thus described our invention, we claim as new and desire to secure by Letters Patent—

1. A clutch, comprising a driving member, a driven member, an intermediate body carried by the driven member and having an unbroken surface of revolution, a band loosely wrapped around said body but unattached thereto and having one end secured to the driving member, and a cone for telescoping with said body and causing the band to become tightly wrapped around said body.

2. A clutch, comprising a driving member, a driven member, a spiral band having one end thereof secured to the driving member, a cone inclosed by the band and normally free to rotate therein and means for gripping the other end of said band to said driven member.

3. A clutch, comprising a driving member, a driven member, a cone, a spiral band surrounding the cone but unattached thereto and having one end thereof secured to the driving member, and means for gripping the other end of said band to said cone.

4. A clutch, comprising a driving member, a driven member, a body carried by said driven member and having an unbroken conical surface, a spiral band surrounding the body and having one end thereof secured to the driving member, and means for gripping the other end of said band to the driven member.

5. A clutch, comprising a driving member, a driven member, two telescoping cones, one of which is secured to the driven member, a spiral band surrounding said last-mentioned cone and having one end thereof secured to the driving member, and means for moving one of said cones in respect to the other to grip the free end of the band therebetween.

6. A clutch, comprising a driving member, a driven member, two telescoping cones of different angularity, one of which is secured to the driven member, a spiral band surrounding said last-mentioned cone and having one end thereof secured to the driving member, and means for moving one of said cones in respect to the other to grip the opposite end of said band therebetween.

7. A clutch, comprising a driving member, a driven member, a cone carried by said driven member, a spiral band encircling said cone and having one end secured to said driving member adjacent the larger end of the cone, and means for binding the opposite end of the band to the smaller end of the cone.

8. A clutch, comprising a driving member, a driven member, a cone, a spiral band having one end secured to the driving member adjacent the larger end of the cone, and means for binding the opposite end of the band to the smaller end of the cone, said means including a second cone adapted to telescope with the first-mentioned cone, one of said cones being longitudinally movable in relation to the other.

9. A clutch, comprising a driving-shaft, a casing carried thereby, a driven member extending into said casing, a cone carried by said driven member, a spiral band encircling said cone and having one end secured to the casing, and means controllable from without the casing to grip the free end of the band to the driven member.

In testimony whereof we have signed our names to this specification in the presence of two subscribing witnesses.

THOMAS J. FAY.
JOHN MAGEE ELLSWORTH.

Witnesses:
   CLAIR W. FAIRBANK,
   EVERARD B. MARSHALL.